(12) United States Patent
Jeong

(10) Patent No.: US 11,182,617 B2
(45) Date of Patent: Nov. 23, 2021

(54) DEVICE AND METHOD FOR GENERATING HEAT MAP

(71) Applicant: HANWHA TECHWIN CO., LTD., Seongnam-Si (KR)

(72) Inventor: Kyoungjeon Jeong, Seongnam-Si (KR)

(73) Assignee: Hanwha Techwin Co., LTD., Seongnam-si (KR)

( * ) Notice: Subject to any disclaimer, the term of this patent is extended or adjusted under 35 U.S.C. 154(b) by 4 days.

(21) Appl. No.: 16/776,432

(22) Filed: Jan. 29, 2020

(65) Prior Publication Data

US 2020/0250434 A1 Aug. 6, 2020

(30) Foreign Application Priority Data

Jan. 31, 2019 (KR) ........................ 10-2019-0012376

(51) Int. Cl.
*G06K 9/00* (2006.01)
*G06K 9/36* (2006.01)
(52) U.S. Cl.
CPC ..... *G06K 9/00718* (2013.01); *G06K 9/00771* (2013.01); *G06K 9/00778* (2013.01); *G06K 9/36* (2013.01)
(58) Field of Classification Search
None
See application file for complete search history.

(56) References Cited

U.S. PATENT DOCUMENTS

| 10,049,283 B2 | 8/2018 | Matsumoto et al. | |
| 2007/0253595 A1* | 11/2007 | Sorensen | G07C 9/00 |
| | | | 382/103 |
| 2019/0220985 A1 | 7/2019 | Park et al. | |
| 2019/0259204 A1 | 8/2019 | Park | |

FOREIGN PATENT DOCUMENTS

KR 10-1887053 8/2018

OTHER PUBLICATIONS

T. Pfeiffer and C. Memili, "GPU-accelerated attention map generation for dynamic 3D scenes," 2015 IEEE Virtual Reality (VR), Arles, France, 2015, pp. 257-258, doi: 10.1109/VR.2015.7223393. (Year: 2015).*

* cited by examiner

*Primary Examiner* — Kim Y Vu
*Assistant Examiner* — Nathan J Bloom
(74) *Attorney, Agent, or Firm* — H.C. Park & Associates, PLC

(57) ABSTRACT

A method for generating a heat map from a video may include: detecting objects in the video; determining retention times of each of the objects in divided areas of the video; normalizing the retention times of each of the objects according to the sum of the retention times of the corresponding object in the divided areas; and generating a heat map based on the normalized retention times.

11 Claims, 10 Drawing Sheets

FIG. 6

| 5/60 | 10/60 | | | | | | |
|---|---|---|---|---|---|---|---|
| 7/50 | 8/50 | 4/50 | 4/50 | 1/50 | | | 40/40 |
| 5/60 | 1/60 | | | | | | |
| 7/50 | | | | 1/50 | | | |
| 5/60 | 1/60 | 1/60 | | | | | |
| 5/50 | | | | 1/50 | | | |
| 5/60 1/20 | 1/20 | 1/60 4/20 | 3/20 | 1/20 | | | |
| 1/50 | | 1/20 | 1/20 1/50 1/20 | 1/20 | 1/20 | 2/20 | |
| 5/60 1/20 | | 1/60 | | 1/20 | | | |
| 1/50 | | 1/20 | 1/50 | | | 3/20 | |
| 3/60 1/20 | | 1/60 | | 1/20 | | | |
| 1/50 | | 1/20 | 1/50 | | | 1/20 | |
| 3/60 1/20 | | 1/60 | 1/60 | 1/60 1/20 | | | |
| 1/50 | | 1/20 | | 1/50 1/20 | 1/20 | 1/20 | 1/20 |
| 3/60 1/20 | 3/60 1/20 | 3/60 1/20 | | 1/60 1/20 | 60/60 | | |
| 1/50 | 1/50 | 1/50 1/20 | | 1/50 1/20 | | | |

NRT1 NRT2 NRT3 NRT4 NRT5

NRT6 — DA

FIG. 8

| 0.22 | 0.32 | 0.08 | 0.08 | 0.02 |      |      |      |
|------|------|------|------|------|------|------|------|
| 0.22 | 0.02 |      |      | 0.02 |      |      |      |
| 0.18 | 0.02 | 0.02 |      | 0.02 |      |      |      |
| 0.15 | 0.05 | 0.27 | 0.20 | 0.12 | 0.05 | 0.05 | 0.10 |
| 0.15 |      | 0.07 |      | 0.07 |      |      | 0.15 |
| 0.12 |      | 0.07 |      | 0.07 |      |      | 0.05 |
| 0.12 |      | 0.07 | 0.02 | 0.14 | 0.05 | 0.05 | 0.05 |
| 0.12 | 0.12 | 0.17 |      | 0.14 |      |      |      |

~DA

DEVICE AND METHOD FOR GENERATING HEAT MAP

CROSS REFERENCE TO RELATED APPLICATION

This application claims priority from and the benefit of Korean Patent Application No. 10-2019-0012376, filed on Jan. 31, 2019, which is hereby incorporated by reference for all purposes as if fully set forth herein.

BACKGROUND

Field

Exemplary embodiments/implementations of the invention relate generally to an electronic device and, more specifically, to a device and method for generating a heat map from a video.

Discussion of the Background

Analysis data on moving lines and interests of visitors in a store may be used as important data for making decision in sales and marketing. Such data may be directly collected through web pages and interviews for the interests of the visitors, or indirectly collected through a video captured through CCTV cameras.

A heat map which is generated based on the video may visualize retention times of the visitors in each area within the video. The heat map visualizes the retention times of the visitors using various colors on a predetermined image. For example, an area where visitors are more frequently located may be displayed in red color on the heat map, and an area where visitors are less frequently located may be displayed in blue color on the heat map. Through the heat map, a store manager can visually check the areas where visitors are more frequently located, and thus identify the interests of customers.

The foregoing is intended merely to aid in the understanding of the technical spirit of the present disclosure, and is not intended to mean that the foregoing falls within the purview of the related art that is already known to those skilled in the art.

The above information disclosed in this Background section is only for understanding of the background of the inventive concepts, and, therefore, it may contain information that does not constitute prior art.

SUMMARY

Various exemplary embodiments are directed to a device and method capable of generating a heat map with improved reliability. The device and method in accordance with the present embodiments of the inventive concepts can prevent unintentional distortion of a heat map, which is caused by an object whose total retention time is excessively long.

Additional features of the inventive concepts will be set forth in the description which follows, and in part will be apparent from the description, or may be learned by practice of the inventive concepts.

In an embodiment, a method for generating a heat map from a video may include: detecting objects in the video; determining retention times of each of the objects in divided areas of the video; normalizing the retention times of each of the objects according to the sum of the retention times of the corresponding object in the divided areas; and generating a heat map based on the normalized retention times.

The generating of the heat map may include: selecting normalized retention times smaller than a threshold value among the normalized retention times; and generating the heat map according to the selected retention times.

The generating of the heat map according to the selected retention times may include: determining a representative value of each of the divided areas by calculating the sum of the selected retention times corresponding to the divided area; and generating the heat map according to the representative values of the divided areas.

The objects may include first to $m^{th}$ objects. The normalizing of the retention times of each of the objects may include normalizing the retention time of the $k^{th}$ object in each of the divided areas by dividing the retention time of the $k^{th}$ object by the sum of the retention times of the $k^{th}$ object in the divided areas, where m is an integer larger than or equal to 2, and k is an integer larger than or equal to 1 and smaller than or equal to m.

The method may further include: generating meta data corresponding to the respective objects by recognizing the objects; and storing the meta data.

The method may further include receiving a user input through a user interface. The generating of the heat map may include: correcting the normalized retention times of each of the objects according to the corresponding meta data in response to the user input; and generating a heat map according to the corrected retention times.

The method may further include receiving a user input for determining a weight corresponding to one or more of the divided areas through a user interface. The generating of the heat map may include: determining corrected retention times by giving the weight to one or more of the normalized retention times of each of the objects; and generating a heat map according to the corrected retention times.

In an embodiment, a computer device for acquiring a video using a camera may include: a storage medium; a video analysis unit configured to detect objects from the video, determine retention times of each of the objects in divided areas of the video, and store the determined retention times in the storage medium; and a heat map provider configured to access the storage medium, normalize the retention times of each of the objects according to the sum of the retention times of the corresponding object, and generate a heat map based on the normalized retention times.

The heat map provider may select normalized retention times smaller than a threshold value among the normalized retention times, and generate the heat map according to the selected retention times.

The heat map provider may determine a representative value of each of the divided areas by calculating the sum of selected retention times corresponding to the divided area, and generate the heat map according to the representative values of the divided areas.

The video analysis unit may generate meta data corresponding to the respective objects by recognizing the objects, and store the meta data.

The computer device may further include a user interface configured to receive a user input, wherein the heat map provider corrects the normalized retention times of each of the objects according to the corresponding meta data in response to the user input, and generates a heat map according to the corrected retention times.

The computer device may further include a user interface configured to receive a user input. A weight corresponding to one or more of the divided areas may be determined according to the user input, and the heat map provider may determine corrected retention times by giving the weight to one or more of the normalized retention times of each of the objects, and generate a heat map according to the corrected retention times.

In accordance with the present embodiments, it is possible to provide a device and method capable of outputting a heat map with improved reliability.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 6 is a diagram illustrating normalized retention times.

FIG. 8 is a diagram illustrating representative values which are determined through the normalized retention times of FIG. 6.

DETAILED DESCRIPTION

Figure 1:
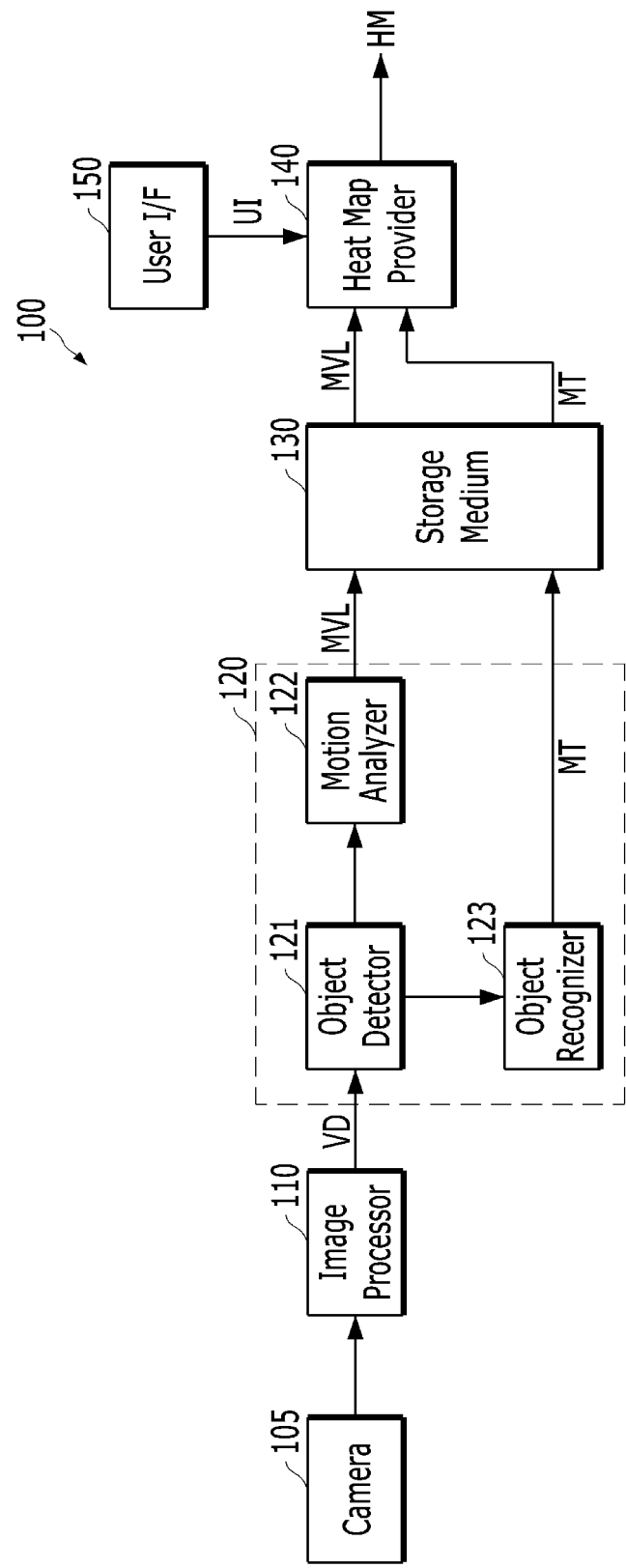
FIG. 1 is a block diagram illustrating a video capturing device in accordance with an embodiment of the present disclosure.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereafter, exemplary embodiments will be described in detail with reference to the accompanying drawings.

Figure 2:
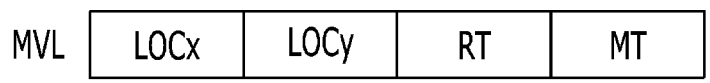
FIG. 2 is a diagram conceptually illustrating moving line information outputted from a motion analysis unit of FIG. 1.

FIG. 1 is a block diagram illustrating a video capturing device in accordance with an embodiment of the present disclosure. FIG. 2 is a diagram conceptually illustrating moving line information outputted from a motion analysis unit of FIG. 1.

Referring to FIG. 1, the video capturing device 100 may include a camera 105, an image processor 110, a motion analysis unit 120, a storage medium 130, a heat map provider 140 and a user interface (I/F) 150.

The camera 105 may include an image sensor for converting optical signals received through a lens into electrical signals. In this case, the image sensor may include a CMOS (Complementary Metal-Oxide Semiconductor) module or CCD (Charge Coupled Device) module. The image sensor may generate images by digitalizing the converted electrical signals. For example, the image sensor may include an analog-to-digital converter.

The image processor 110 is connected to the camera 105. The image processor 110 is configured to generate a video VD by processing the images received from the camera 105. For example, the image processor 110 may adjust the sizes or resolutions of the received images or perform other necessary processes.

The motion analysis unit 120 is connected to the image processor 110. The motion analysis unit 120 is configured to receive the video VD from the image processor 110, detect and recognize objects included in the video VD, track the motions of the objects, and thus generate moving line information MVL.

The motion analysis unit 120 may include an object detector 121, a motion analyzer 122 and an object recognizer 123.

The object detector 121 is configured to recognize or detect the objects included in the video VD. Here, the detected objects may be humans. The object detector 121 may include one or more of various human recognition algorithms which are publicly known in the art.

The motion analyzer 122 may track the motion of an object identified by the object detector 121. The motion analyzer 122 may track the motion of the object by comparing front and rear frames of the video VD, and include one or more of various object tracking algorithms which are publicly known in the art.

The motion analyzer 122 is configured to analyze the motion of the object, generate moving line information MVL according to the analysis result, and store the moving line information MVL in the storage medium 130. The captured area of the video VD may be divided into a plurality of areas (see DA of FIG. 5). At this time, the motion analyzer 122 may detect a divided area where the object is located, among the divided areas, and the retention time RT during which the object stays in the divided area, in order to generate the moving line information MVL. Referring to FIG. 2, the moving line information MVL may include the coordinate information LOCx and LOCy of the divided area where the object is located and the retention time RT in the divided area. FIG. 2 illustrates the coordinate information LOCx and LOCy of one divided area and the retention time RT corresponding to the coordinate information. However, when the object has moved through a plurality of divided areas, the moving line information MVL may include the respective pieces of coordinate information of the plurality of divided areas and retention times corresponding to the respective pieces of coordinate information.

Referring back to FIG. 1, the object recognizer 123 is configured to recognize the face of the object detected by the object detector 121, generate meta data MT indicating the characteristics of the object according to the recognition result, and store the generated meta data MT in the storage medium 130. The object recognizer 123 may detect an area including the face image of the object, recognize feature information of the detected face image, for example, feature points, and generate the meta data MT according to the feature information of the face image. In embodiments, the meta data MT may include information indicating various characteristics such as the sex and age band of the object.

The storage medium 130 is connected to the motion analysis unit 120 and the heat map provider 140. The storage medium 130 is configured to store the moving line information MVL and the meta data MT. In embodiments, the storage medium 130 may include one or more of various types of storage media such as a flash memory and hard disk, which can retain data stored therein even though power is removed, or one or more of memories such as an SRAM (Static RAM), DRAM (Dynamic RAM) and SDRAM (Synchronous DRAM).

The heat map provider 140 is connected to the storage medium 130. The heat map provider 140 is configured to read the moving line information MVL, and generate a heat map HM according to the read moving line information MVL.

In embodiments, each of the motion analysis unit 120 and the heat map provider 140 may be implemented through hardware, software, firmware or combinations thereof. For example, when the motion analysis unit 120 and the heat map provider 140 are implemented through software, the video capturing device 100 includes one or more processors configured to execute program codes and/or commands. When the processor is driven, the processor may load program codes and/or commands for performing the functions of the motion analysis unit 120 and the heat map provider 140 into a memory, and execute the loaded program codes and/or commands. As such, the video capturing device 100 may be a computer device which includes the camera 105 and the image processor 110, and has one or more processors capable of processing a video VD by executing program codes and/or commands.

Figure 3:
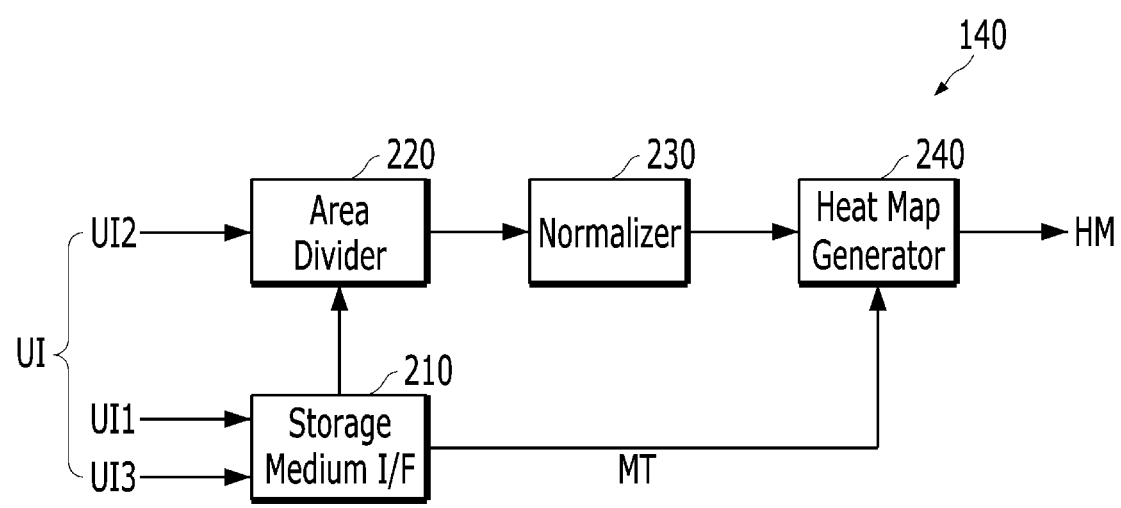
FIG. 3 is a block diagram illustrating a heat map provider of FIG. 1 in more detail.

FIG. 3 is a block diagram illustrating the heat map provider of FIG. 1 in more detail.

Referring to FIGS. 1 and 3, the heat map provider 140 may include a storage medium I/F 210, an area divider 220, a normalizer 230 and a heat map generator 240.

The storage medium I/F 210 may read, from the storage medium 130, pieces of coordinate information included in the moving line information MVL and retention times corresponding to the respective pieces of coordinate information, and transfer the read pieces of coordinate information and retention times to the area divider 220. In embodiments, the moving line information MVL may include a time stamp. When receiving a first user input UI1 for selecting a time period (ex. one minute, one hour or one day) through the user I/F 150, the storage medium I/F 210 may read the moving line information MVL of a video VD captured in the selected time period.

The area divider 220 is configured to redefine the divided areas defined by the motion analysis unit 120, and provide retention times corresponding to the redefined divided areas, respectively. In embodiments, when receiving a second user input UI2 for selecting the size of the divided areas through the user I/F 150, the area divider 220 may redefine the divided areas according to the selected size of the divided areas, and calculate retention times corresponding to the redefined divided areas, respectively. For example, when the second user input UI2 selects a size four times larger than that of the divided areas defined by the motion analysis unit 120, the area divider 220 may group four divided areas adjacent to one another (see DAG of FIG. 5), add or average retention times corresponding to the grouped areas for each object, and output the added or averaged retention time. Hereafter, suppose that the area divider 220 maintains the divided areas defined by the motion analysis unit 120, for convenience of description.

The normalizer 230 is configured to normalize the retention times according to the total retention time of the corresponding object. The normalizer 230 may normalize the retention time in each of the divided areas by dividing the retention time in the divided area by the sum of the retention times of the corresponding object in the entire divided areas. Therefore, the normalizer 230 may output the normalized retention time corresponding to each of the divided areas.

Some of the objects detected in the video VD may stay in the video VD for a relatively long time. For example, when the video VD for the inside of a store is captured, a specific visitor in the store may stay for a relatively long time. In this case, due to a relatively long retention time of the visitor, retentions times of other visitors may not be substantially reflected into a heat map HM. This indicates that the heat map MH may be unintentionally distorted.

In accordance with the present embodiment, the normalizer 230 is configured to normalize retention times of an object according to the total retention time of the object. Thus, the normalizer 230 can prevent unintentional distortion of the heat map HM, which may be caused by the object whose total retention time is excessively long. Therefore, it is possible to provide the heat map provider 140 and the video capturing device 100 which output a heat map HM with improved reliability.

The heat map generator 240 is configured to generate the heat map HM according to the normalized retention times. The heat map generator 240 may determine whether there are normalized retention times equal to or larger than a threshold value, among the normalized retention times, and drop the normalized retention times equal to or larger than the threshold value.

Some of the objects detected in the video VD may stay in specific divided areas of the video VD for a relatively long time. For example, when the video VD for the inside of a store is captured, a clerk may continuously stay in a specific area. In this case, although a heat map HM involved with visitors is required, the divided area where the clerk has stayed may have a much longer retention time than the divided areas of visitors. This indicates that the heat map MH may be unintentionally distorted.

In accordance with the present embodiment, the heat map generator 240 may select normalized retention times smaller than the threshold value among the normalized retention times, and generate the heat map HM according to the selected retention times. Thus, the heat map generator 240 can prevent unintentional distortion of the heat map HM, which may be caused by a specific object. Therefore, it is possible to provide the heat map provider 140 and the video capturing device 100 which output the heat map HM with improved reliability.

The heat map generator 240 may convert the normalized retention times according to the meta data MT of the corresponding object, and generate the heat map HM according to the converted retention times.

Figure 4:
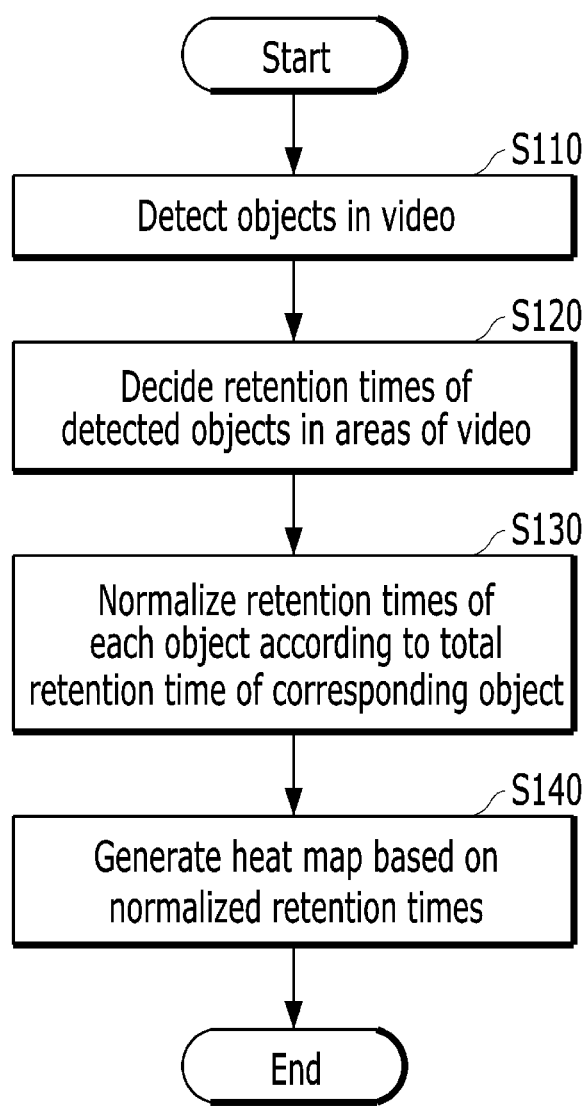
FIG. 4 is a flowchart illustrating an operating method of a video capturing device in accordance with an embodiment of the present disclosure.
Figure 5:
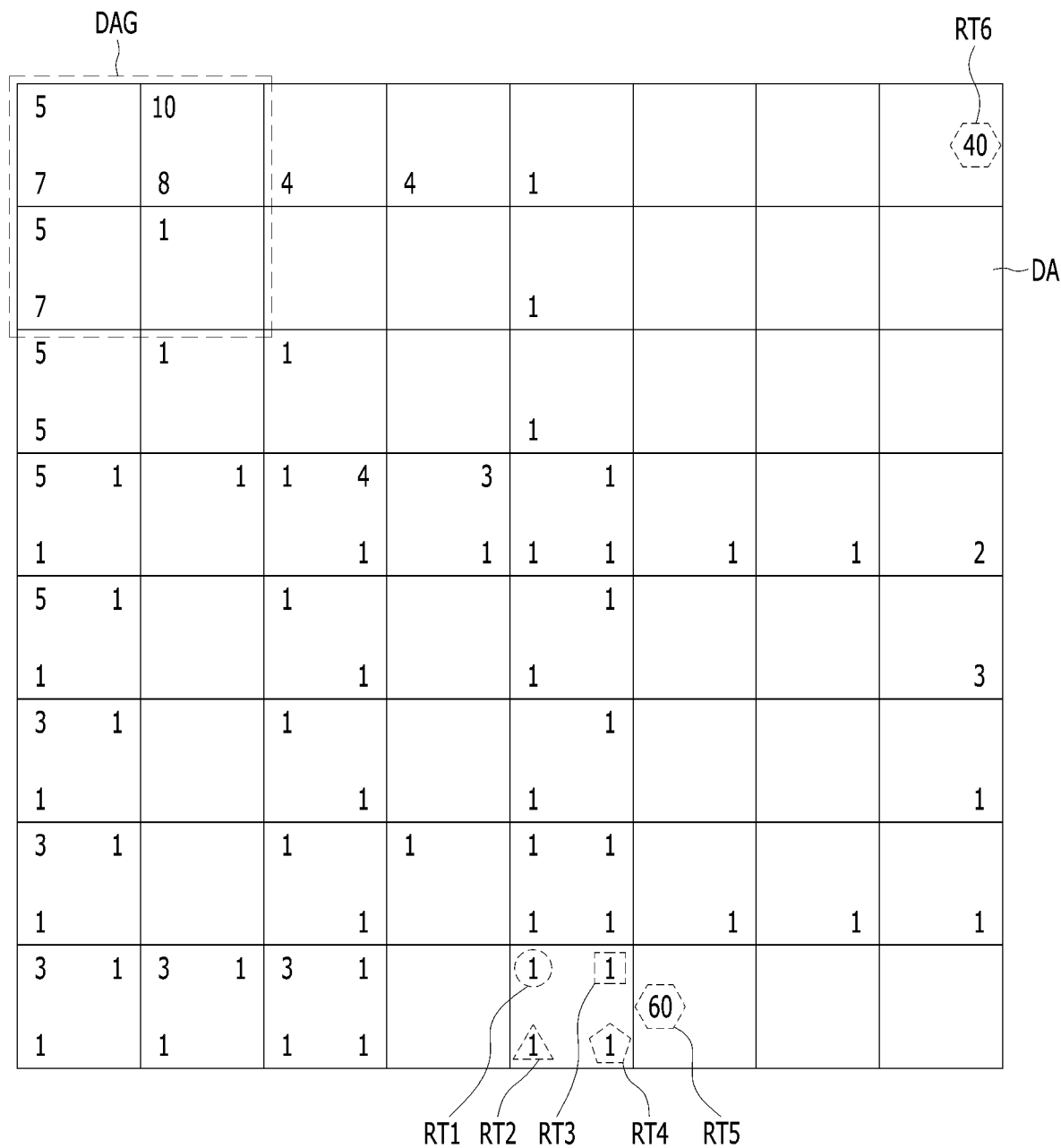
FIG. 5 is a diagram illustrating retention times of divided areas.

FIG. 4 is a flowchart illustrating an operating method of the video capturing device in accordance with an embodiment of the present disclosure. FIG. 5 is a diagram illustrating retention times of divided areas. FIG. 6 is a diagram illustrating normalized retention times.

Referring to FIG. 4, an object is detected in a video VD in step S110. In step S120, retention times of the detected object in divided areas of the video VD (see FIG. 1) are determined. The determined retention times and the respective pieces of coordinate information of the divided areas corresponding to the determined retention times may be stored in the storage medium 130 (see FIG. 1). FIG. 5 illustrates the retention times corresponding to the divided areas DA. Suppose that six objects have been detected. A first retention time RT1 corresponding to a first object, a second retention time RT2 corresponding to a second object, a third retention time RT3 corresponding to a third object, a fourth retention time RT4 corresponding to a fourth object, a fifth retention time RT5 corresponding to a fifth object and a sixth retention time RT6 corresponding to a sixth object correspond to one or more of the divided areas DA. In FIG. 5, the first retention time RT1 is marked at the left top of the corresponding divided area, the second retention time RT2 is marked at the left bottom of the corresponding divided area, the third retention time RT3 is marked at the right top of the corresponding divided area, the fourth retention time RT4 is marked at the right bottom of the corresponding divided area, the fifth retention time RT5 is marked at the left middle of the corresponding divided area, and the sixth retention time RT6 is marked at the right middle of the corresponding divided area, for convenience of recognition.

Referring back to FIG. 4, the retention times of each of the objects are normalized according to the total retention time of the corresponding object, in step S130. The retention time of the object in each of the divided areas may be normalized by dividing the retention time of the object in the corresponding divided area by the sum of the retentions times of the object in the divided areas. FIG. 6 illustrates the normalized retention times corresponding to each of the divided areas DA. In FIG. 5, the sum of the first retention times RT1 is 60. The first retention times RT1 are divided by 60 and converted into first normalized retention times NRT1, respectively. The second retention times RT2 of FIG. 5 are divided by 50 which is the sum of the second retention times RT2, and converted into second normalized retention times NRT2, respectively. The third retention times RT3 of FIG. 5 are divided by 20 which is the sum of the third retention times RT3, and converted into third normalized retention times NRT3, respectively. The fourth retention times RT4 of FIG. 5 are divided by 20 which is the sum of the fourth retention times RT4, and converted into fourth normalized retention times NRT4, respectively. The fifth object is detected in one divided area. Thus, the fifth retention time RT5 of FIG. 5 is divided by itself, and converted into a fifth normalized retention time NRT5. The sixth object is detected in one divided area. Thus, the sixth retention time RT6 of FIG. 5 is divided by itself, and converted into a sixth normalized retention time NRT6.

Referring back to FIG. 4, a heat map is generated based on the normalized retention times in step S140.

In accordance with the present embodiment, the retention times of each of the objects are normalized according to the total retention time of the corresponding object. Thus, it is possible to prevent unintentional distortion of the heat map, which may be caused by an object whose total retention time is excessively long. Therefore, the method in accordance with the embodiment of the present disclosure can provide a heat map with improved reliability.

Figure 7:
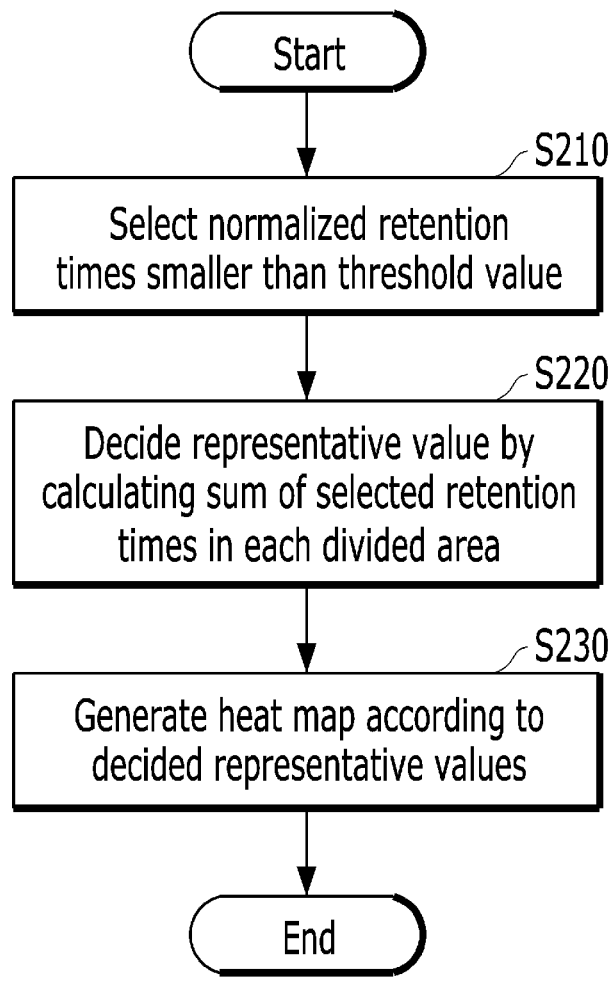
FIG. 7 is a flowchart illustrating an embodiment of a method for generating a heat map based on the normalized retention times.

FIG. 7 is a flowchart illustrating an embodiment of a method for generating a heat map based on the normalized retention times. FIG. 8 is a diagram illustrating representative values which are determined through the normalized retention times of FIG. 6.

Referring to FIG. 7, normalized retention times smaller than the threshold value are selected in step S210. Referring back to FIG. 6, the fifth normalized retention time NRT5 and the sixth normalized retention time NRT6 are 1. When the threshold value is 0.7, the fifth normalized retention time NRT5 and the sixth normalized retention time NRT6 may be dropped, and the other normalized retention times NRT1 to NRT4 may be selected. In embodiments, the threshold value may be set according to a user input.

Referring back to FIG. 7, the sum of the selected retention times in each of the divided areas is calculated to determine a representative value in step S220. Referring to FIG. 8, the representative values of the respective divided areas DA are expressed to the nearest hundredths. In embodiments, after the representative values are determined, the representative values of the respective divided areas may be divided by the sum of the representative values of the entire divided areas and then normalized.

Referring back to FIG. 7, a heat map is generated according to the determined representative values in step S230. For example, the heat map may be generated through a process of defining the maximum and minimum values of the representative values, allocating first and second colors to the maximum and minimum values, dividing a numerical value range between the maximum and minimum values into predetermined numerical value ranges, and allocating colors, which change from the first color to the second color, to the divided numerical value ranges. However, the embodiments of the present disclosure are not limited thereto, and the heat map may be generated through various methods.

In accordance with the embodiment of the present disclosure, the normalized retention times smaller than the threshold value among the normalized retention times may be selected, and the heat map may be generated according to the selected retention times. Thus, it is possible to prevent unintentional distortion of the heat map, which may be caused by a specific object. Therefore, the method in accordance with the embodiment of the present disclosure may provide a heat map with improved reliability.

Figure 9:
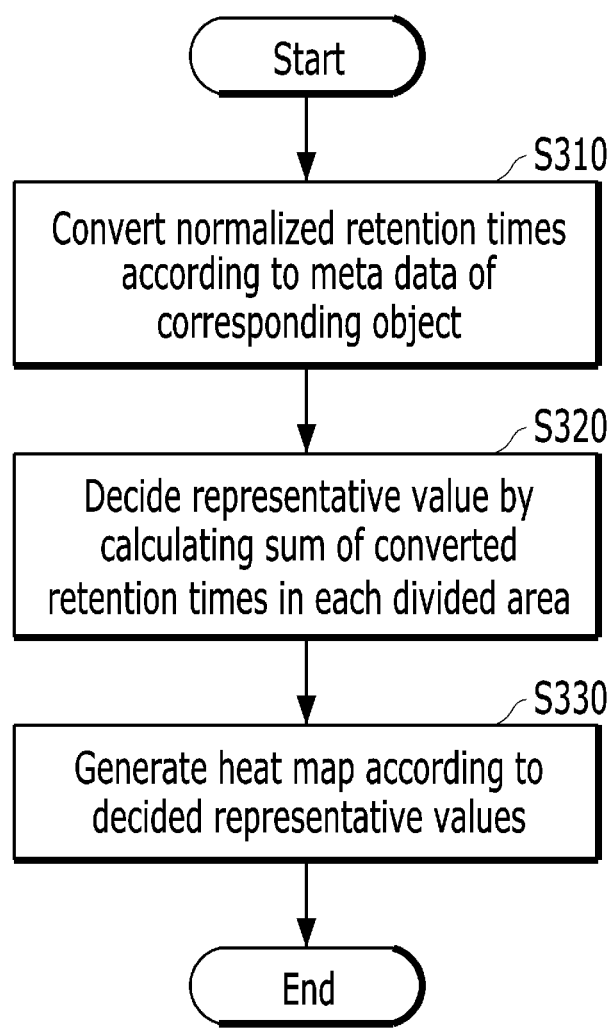
FIG. 9 is a flowchart illustrating another embodiment of the method for generating a heat map based on the normalized retention times.

FIG. 9 is a flowchart illustrating another embodiment of the method for generating a heat map based on the normalized retention times.

Referring to FIG. 9, normalized retention times are converted according to the meta data of the corresponding object in step S310. As described above with reference to FIG. 1, a face included in an object detected in the video VD may be recognized, and meta data MT generated according to the recognition result may be stored in the storage medium 130. At this time, the normalized retention times may be converted by applying a weight according to the meta data MT of the corresponding object. For example, when a double weight is given to a female and the meta data MT corresponding to the first object indicates a female, the first normalized retention time NRT1 of FIG. 6 may be multiplied by 2. According to meta data MT corresponding to an object, a weight may be given to the retention times corresponding to the object. The weight may be set according to a user input. Thus, it is possible to provide a heat map HM coinciding with a user's request.

In step S320, the sum of the converted retention times in each of the divided areas is calculated to determine a representative value. In step S330, a heat map is generated according to the determined representative values of the divided areas.

Figure 10:
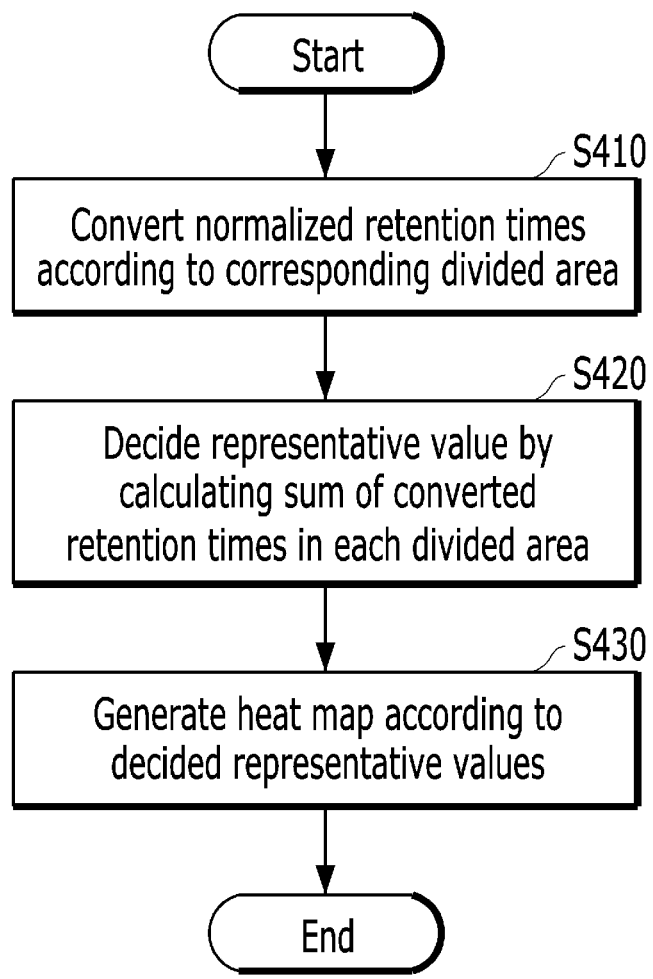
FIG. 10 is a flowchart illustrating still another embodiment of the method for generating a heat map based on the normalized retention times.

FIG. 10 is a flowchart illustrating still another embodiment of the method for generating a heat map based on the normalized retention times.

Referring to FIG. 10, normalized retention times are converted according to the corresponding divided areas in step S410. The normalized retention times may be converted by applying a weight according to the corresponding divided areas. For example, when some of the divided areas are selected according to a user input, a weight may be given to the normalized retention times of the selected divided areas and/or divided areas adjacent to the selected divided areas. Thus, it is possible to provide a heat map HM coinciding with a user's request.

In step S420, the sum of the converted retention times in each of the divided areas is calculated to determine a representative value. In step S430, a heat map is generated according to the determined representative values of the divided areas.

Figure 11:
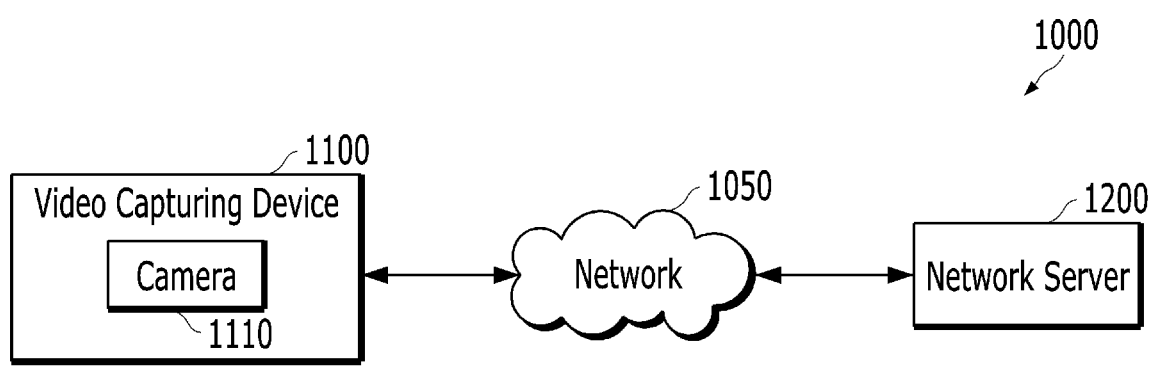
FIG. 11 is a block diagram illustrating a network system including a video capturing device.

FIG. 11 is a block diagram illustrating a network system including a video capturing device.

Referring to FIG. 11, the network system 1000 includes a network 1050, a video capturing device 1100 and a network server 1200.

The network 1050 connects the video capturing device 1100 and the network server 1200. The network 1050 may include one or more of a public network, one or more private networks, a wired network, a wireless network, another proper type of network, and combinations thereof. Each of the video capturing device 1100 and the network server 1200 may include one or more of a wired communication function and a wireless communication function. Thus, the video capturing device 1100 and the network server 1200 may communicate with each other through the network 1050.

The video capturing device 1100 is connected to the network server 1200 through the network 1050. The video capturing device 1100 includes a camera 1110. The camera 1110 may function as the camera 105 described with reference to FIG. 1.

The video capturing device 1100 may be provided as the video capturing device 100 described with reference to FIG. 1, and perform the operations described with reference to FIGS. 4, 7, 9 and 10. The video capturing device 1100 may generate meta data MT (see FIG. 1) by detecting and recognizing an object included in a video VD (see FIG. 1), generate moving line information MVL (see FIG. 1) by analyzing motion of the object, and generate a heat map HM (see FIG. 1) based on the moving line information MVL and/or the meta data MT.

The video capturing device 1100 may include a display device for displaying the heat map HM. The video capturing device 1100 may provide the heat map HM to the network server 1200 through the network 1050.

The network server 1200 may communicate with the video capturing device 1100 through the network 1050. The network server 1200 is configured to display the heat map HM transmitted from the video capturing device 1100. For example, the network server 1200 may include an application such as a web viewer, which can display a video transmitted from the video capturing device 1100 on the display device, and a processor which can execute such an application.

Some of the functions of the video capturing device 1100 may be performed by the network server 1200. In embodiments, the video capturing device 1100 may generate meta data MT by detecting and recognizing an object included in a video VD, and generate moving line information MVL by analyzing motion of the object, and the network server 1200 may generate a heat map HM based on the moving line information MVL and/or the meta data MT. In this case, when the network server 1200 is operated, the network server 1200 may load the program codes and/or commands for performing the functions of the heat map provider 140 of FIG. 1 into a memory, and execute the loaded program codes and/or commands.

In embodiments, the video capturing device 1100 may provide the video VD, and the network server 1200 may generate meta data MT by detecting and recognizing an object included in the video VD, generate moving line information MVL by analyzing motion of the object, and generate a heat map HM based on the moving line information MVL and/or the meta data MT. In this case, when the network server 1200 is operated, the network server 1200 may load the program codes and/or commands for performing the functions of the motion analysis unit 120 and the heat map provider 140 of FIG. 1 into a memory, and execute the loaded program codes and/or commands.

Some of the advantages that may be achieved by exemplary embodiments of the invention and/or exemplary methods of the invention include providing a device and method capable of outputting a heat map with improved reliability.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method for generating a heat map from a video, the method comprising:
   detecting objects in the video;
   determining retention times of each of the objects in divided areas of the video;
   normalizing the retention times of each of the objects according to a sum of the retention times of the corresponding object in the divided areas; and
   generating a heat map based on the normalized retention times,
   wherein the generating of the heat map comprises:
   selecting normalized retention times smaller than a threshold value among the normalized retention times; and
   generating the heat map according to the selected retention times.

2. The method of claim 1, wherein the generating of the heat map according to the selected retention times comprises:
   determining a representative value of each of the divided areas by calculating a sum of the selected retention times corresponding to the divided area; and
   generating the heat map according to the representative values of the divided areas.

3. The method of claim 1, wherein the objects comprise first to $m^{th}$ objects,
   wherein the normalizing of the retention times of each of the objects comprises normalizing the retention time of the $k^{th}$ object in each of the divided areas by dividing the retention time of the $k^{th}$ object by a sum of the retention times of the $k^{th}$ object in the divided areas, where m is an integer larger than or equal to 2, and k is an integer larger than or equal to 1 and smaller than or equal to m.

4. The method of claim 1, further comprising:
generating meta data corresponding to the respective objects by recognizing the objects; and
storing the meta data.

5. The method of claim 4, further comprising receiving a user input through a user interface,
wherein the generating of the heat map comprises:
correcting the normalized retention times of each of the objects according to the corresponding meta data in response to the user input; and
generating a heat map according to the corrected retention times.

6. The method of claim 1, further comprising receiving a user input for determining a weight corresponding to one or more of the divided areas through a user interface,
wherein the generating of the heat map comprises:
determining corrected retention times by giving the weight to one or more of the normalized retention times of each of the objects; and
generating a heat map according to the corrected retention times.

7. A computer device for acquiring a video using a camera, the computer device comprising:
a storage medium;
a video analysis unit configured to detect objects from the video, determine retention times of each of the objects in divided areas of the video, and store the determined retention times in the storage medium; and
a heat map provider configured to access the storage medium, normalize the retention times of each of the objects according to a sum of the retention times of the corresponding object, and generate a heat map based on the normalized retention times,
wherein the heat map provider is configured to select normalized retention times smaller than a threshold value among the normalized retention times, and to generate the heat map according to the selected retention times.

8. The computer device of claim 7, wherein the heat map provider is configured to determine a representative value of each of the divided areas by calculating a sum of selected retention times corresponding to the divided area, and to generate the heat map according to the representative values of the divided areas.

9. The computer device of claim 7, wherein the video analysis unit generates meta data corresponding to the respective objects by recognizing the objects, and stores the meta data.

10. The computer device of claim 9, further comprising a user interface configured to receive a user input,
wherein the heat map provider is configured to correct the normalized retention times of each of the objects according to the corresponding meta data in response to the user input, and to generate a heat map according to the corrected retention times.

11. The computer device of claim 7, further comprising a user interface configured to receive a user input,
wherein a weight corresponding to one or more of the divided areas is determined according to the user input, and
the heat map provider is configured to determine corrected retention times by giving the weight to one or more of the normalized retention times of each of the objects, and to generate a heat map according to the corrected retention times.

* * * * *